B. SPENCER.
STRAW CUTTER.
No. 48,597. Patented July 4, 1865.
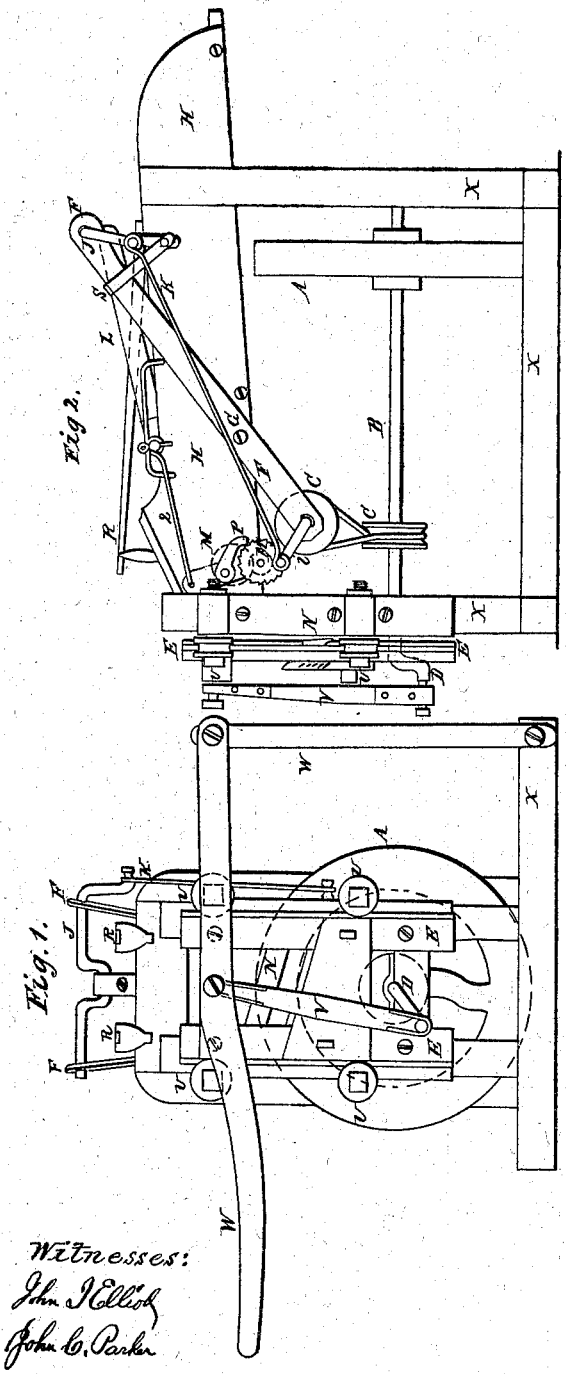
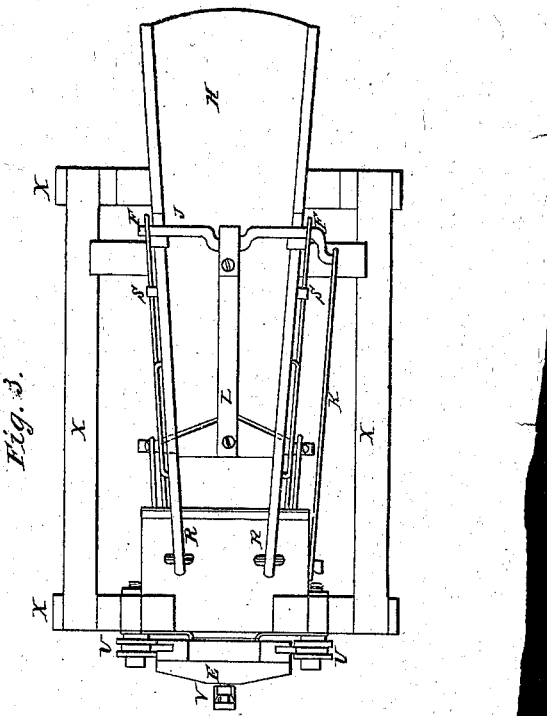
Witnesses:
John J. Elliot
John C. Parker
Inventor:
Basil Spencer
by his Atty
J. Franklin Reigart

UNITED STATES PATENT OFFICE.

BASIL SPENCER, OF LEWISBURG, PENNSYLVANIA.

IMPROVEMENT IN STRAW-CUTTERS.

Specification forming part of Letters Patent No. 48,597, dated July 4, 1865.

*To all whom it may concern:*

Be it known that I, BASIL SPENCER, of Lewisburg, Union county, State of Pennsylvania, have invented new and useful Improvements in Straw-Cutters; and I do hereby declare the following to be an exact description thereof, reference being had to the accompanying drawings, and to the letters of reference marked thereon, making a part of this specification.

The nature of my invention consists in the arrangement and combination of the devices for feeding the straw and cutting the same by hand or horse power.

Figure 1 represents a front elevation; Fig. 2, a side elevation; Fig. 3, a top view.

A represents the driving-wheel, whose shaft B operates the feeding devices by pulleys C C and the crank D, that raises and lowers the knife-frame E.

F are flat bars, working on screw-bolts as a fulcrum, at G, on each side of the feeding and cutting box H. Crank-shafts I and J are attached to each end of bars F. The crank I revolves, but crank J only vibrates, and does not revolve, but is moved by the pitman or connecting-rod K to give the forward and backward motion to the rake-head L, that presses and shoves the straw forward between the two rollers M M to the front of the straw-box H, where the straw is cut by the descending oblique knife N. A ratchet and dog, P, is attached to the rake-head L by pitmans Q Q, (on each side of the box H.) One pitman moves the lower roller M, the other the upper roller M, these rollers operating as regulating-feeders. The springs R bear upon the shaft of the upper adjustable roller M to press down the straw to insure the cutting, the roller adjusting itself up and down according to the quantity of straw, and the movable rods S S are thrown back at any time required upon the lever-bars F, to bear down upon the upper ends of bars to tighten the band or cord of the pulleys C C to secure their correct and regular revolution.

The knife N is set obliquely in a movable sliding frame operating vertically between guides U. The arm V is attached to the crank D on the end of main shaft B and to the top of frame, so that the machine can be driven by horse-power connected with driving-wheel A, or by hand-power by operating the lever W, that is connected with the arm V and the frame X of the machine.

What I claim as my invention, and desire to secure by Letters Patent, is—

The arrangement and combination of the bars F with their pitman K, crank-shafts I and J as connected with the rake-head L, and feeding-rollers M, and arm V, and operating-lever W, when arranged and combined as herein described, and for the purposes set forth.

BASIL SPENCER.

Witnesses:
S. W. BARR,
C. W. SPRATT.